United States Patent
Banda et al.

(10) Patent No.: US 6,226,690 B1
(45) Date of Patent: May 1, 2001

(54) METHOD AND APPARATUS FOR UTILIZING PROXY OBJECTS TO COMMUNICATE WITH TARGET OBJECTS

(75) Inventors: Venu Banda; Frank Richard Campagnoni; Michael Haden Conner; George Prentice Copeland; Marc Gregory Smith; Erin Elizabeth Shepler, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/077,219

(22) Filed: Jun. 14, 1993

(51) Int. Cl.[7] .................................................. G06F 15/16
(52) U.S. Cl. ......................... 709/315; 709/203; 709/202
(58) Field of Search .................................. 395/200, 800, 395/600, 650, 275, 725, 500, 325

(56) References Cited

U.S. PATENT DOCUMENTS

| | | | |
|---|---|---|---|
| 4,825,354 | * 4/1989 | Agrawal et al. | 395/600 |
| 5,187,790 | * 2/1993 | East et al. | 395/725 |
| 5,249,293 | * 9/1993 | Schreiber et al. | 395/650 |
| 5,307,490 | * 4/1994 | Davidson et al. | 395/650 |
| 5,325,527 | * 6/1994 | Cwikowski et al. | 395/650 |
| 5,377,350 | * 12/1994 | Skinner | 395/650 |
| 5,481,721 | * 1/1996 | Serlet et al. | 395/700 |
| 5,497,463 | * 3/1996 | Stein et al. | 395/200.03 |

* cited by examiner

*Primary Examiner*—Mehmet B. Geckil
(74) *Attorney, Agent, or Firm*—Volel Emile; Felsman, Bradley, Vaden, Gunter & Dillon, LLP

(57) ABSTRACT

A method for a first process in a first address space to communicate with an object in a second address space including the steps of determining, during runtime of the first process, that a communication link is needed between the first process and a target object in the second address space, generating a proxy object in the first address space corresponding to the target object, and establishing the communication link between the first process and the target object through the proxy object. In addition, an apparatus for a first process in a first address space to communicate with an object in a second address space including apparatus for determining, during runtime of the first process, that a communication link is needed between the first process and a target object in the second address space, apparatus for generating a proxy object in the first address space corresponding to the target object, and apparatus for establishing the communication link between the first process and the target object through the proxy object.

16 Claims, 11 Drawing Sheets

FIG. 1
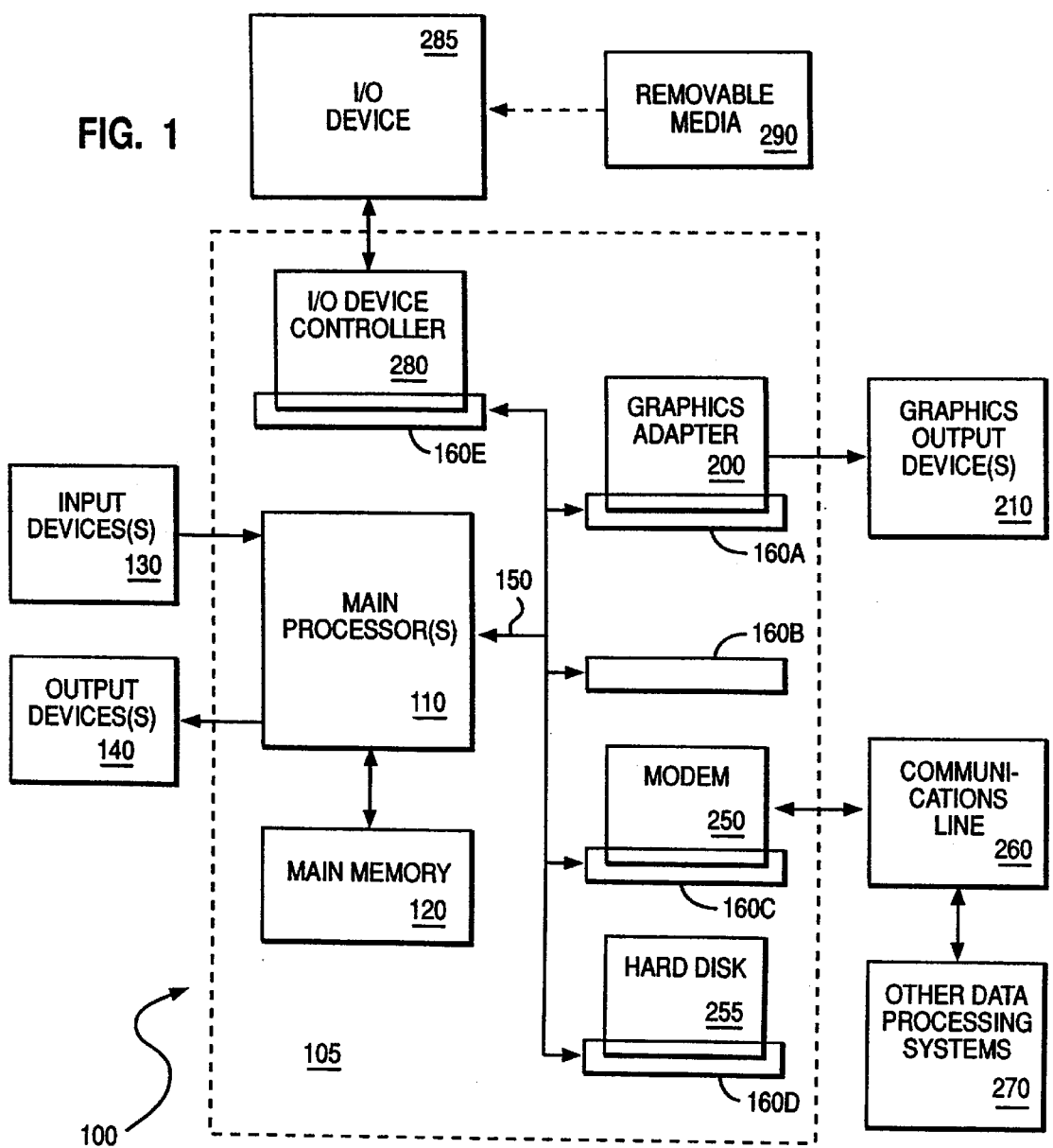
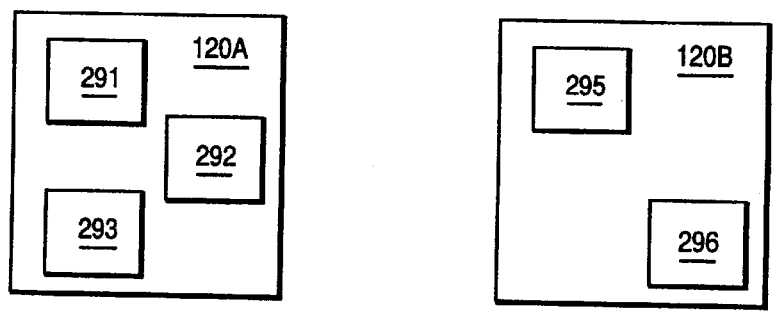
FIG. 2

METHOD AND APPARATUS FOR UTILIZING PROXY OBJECTS TO COMMUNICATE WITH TARGET OBJECTS

RELATED PATENT APPLICATIONS

Related patent applications include commonly assigned copending patent application U.S. Ser. No. 08/077,221 filed on the same date as the present application, entitled "METHOD AND APPARATUS FOR ACTIVATING AND EXECUTING REMOTE OBJECTS", hereby incorporated by reference.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

TECHNICAL FIELD

The present invention relates to data processing systems and more particularly to communications between objects having different address spaces.

BACKGROUND ART

The development of programming for data processing systems has traditionally been a time consuming task. Object oriented programming (OOP) has emerged as a promising new technology which will allow more efficient development reuse and customization of new software programming. Object oriented programming shifts the emphasis of software development away from function decomposition and towards the recognition of units of software called "objects" which encapsulate both data and functions. As a result, programs become easier to maintain and enhance.

Yet despite its promise, object oriented technology has not penetrated major commercial software products to date. This is due in part because of the obstacles which the developer must confront when utilizing object oriented programming. A first obstacle that developers must confront is the choice of which object oriented programming language to use. The early expressions of object oriented programming concept focused on the creation of toolkits and languages, each of which are designed to exploit some particular aspect of OOP. So called pure object oriented languages such as SmallTalk use a runtime environment which will operate smoothly and consistently so long as the developer works within the supplied environment. However, when interacting with foreign environments, the objects must be reduced to data structures which do not retain the advantages which objects offer with regard to encapsulation and code use. Hybrid languages, such as C++ require less runtime support, but can result in tight bindings between the programs which provide the objects and the clients which use them. Tight binding implies that the client programs must be recompiled whenever simple changes are made to the library. The second obstacle is the disparity in concept among the plurality of different object oriented languages. That is, toolkits embrace different incompatible models of what objects are and how they work. The software developed using any particular language or tool kit is limited in scope. A program implemented in one language can rarely be used in another.

The System Object Module "SOM" is a new object oriented technology for building packaging and manipulating object oriented programs designed to unite various object oriented approaches. In SOM, the interfaces of the classes of objects, together with the names of the method they support, the return types, the parameter types and so forth, are specified in a standard language called the Interface Definition Language (IDL). The actual implementation of the object class can be performed in whatever programming language the developer prefers. The preferred programming language need not necessarily be an object oriented programming language, but might be a procedural language such as C. Thus, the advantages of object oriented programming can be extended to programmers of non-object oriented programming languages. SOM is described in greater detail in the OS2.20 *SOM Guide and Reference,* a publication of the IBM Corporation, which is hereby incorporated by reference.

There also exists distributed OOP models which are extensions of standard OOP systems. Standard OOP systems are typically restricted to utilizing or making calls to objects within the same address space as the process utilizing or calling those objects. That is, a process typically cannot access objects located within other processes including where those other processes are located on the same or different host computers. However, distributed OOP systems allow processes to access objects located in remote address spaces including address spaces located in the same or other host systems. A standard for such distributed OOP systems currently exists called Common Object Request Broker Architecture (CORBA) and is described in *The Common Object Request Broker: Architecture and Specification,* published by the Object Management Group and X Open, which is hereby incorporated by reference. This architecture allows a process to make calls to objects in other address spaces, typically by constructing the necessary communication paths during compilation.

DISCLOSURE OF THE INVENTION

The present invention includes a method for a first process in a first address space to communicate with an object in a second address space including the steps of determining, during runtime of the first process, that a communication link is needed between the first process and a target object in the second address space, generating a proxy object in the first address space corresponding to the target object, and establishing the communication link between the first process and the target object through the proxy object. In addition, the present invention includes an apparatus for a first process in a first address space to communicate with an object in a second address space including apparatus for determining, during runtime of the first process, that a communication link is needed between the first process and a target object in the second address space, apparatus for generating a proxy object in the first address space corresponding to the target object, and apparatus for establishing the communication link between the first process and the target object through the proxy object.

A further understanding of the nature and advantages of the present invention may be realized by reference to the remaining portions of the specification and the drawings.

BRIEF DESCRIPTION OF THE DRAWINGS

FIG. 1 is a block diagram of a typical data processing system utilized by a preferred embodiment of the invention;

FIG. 2 is a block diagram illustrating the address spaces utilized by various processes in main memory according to a preferred embodiment of the invention;

BEST MODE FOR CARRYING OUT THE INVENTION

Figure 3:
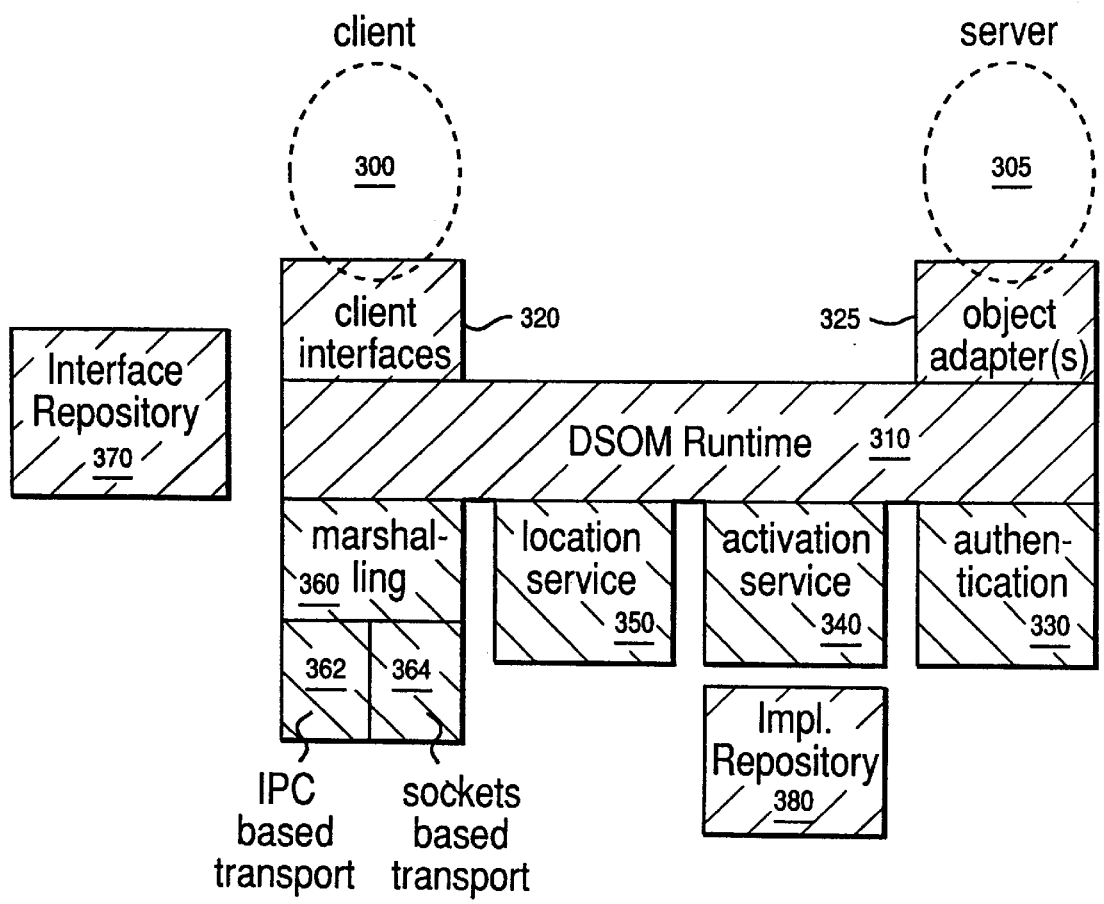
FIG. 3 is a block diagram of the primary component utilized by a preferred distributed object system.

The invention may be run on a variety of computers or collection of computers under a number of different operating systems. The computer could be, for example, a personal computer, a minicomputer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2 Model* 50, 60 systems IBM Corporation, Part No. 68X2224 Order No. S68X-2224 and *Technical Reference Manual Personal Systems/2 (Model* 80) IBM Corporation Part No. 68X2256 Order No. S68X-2254. One operating system which an IBM PS/2 personal computer may run is IBM's OS/2 2.0 (TM). For more information on the IBM OS/2 2.0 Operating System, the reader is referred to *OS/2 2.0 Technical Library, Programming Guide,* Vols. 1, 2, 3 Version 2.00 Order No. 10G6261, 10G6495, 10G6494.

In the alternative, the computer system might be in the IBM RISC System/6000 (TM) line of computers which run on the AIX (TM) operating system. The various models of the RISC System/6000 are described in many publications of the IBM Corporation, for example, *RISC System/6000, 7073 and 7016 POWERstation and POWERserver Hardware Technical Reference,* Order No. SA23-2644-00. The AIX operating system is described in *General Concepts and Procedures—AIX Version* 3 *for RISC System/6000,* Order No. SC23-2202-00, as well as other publications of the IBM Corporation.

FIG. 1 is a block diagram of a typical data processing system 100 utilized by a preferred embodiment of the invention. The data processing system includes main processor(s) 110 coupled to a main memory 120 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. The main processor may also be coupled to graphics output device(s) 210 such as a graphics display through a graphics adapter 200. Graphics adapter 200 may be located in an adapter slot 160A. Graphics adapter 200 receives instructions regarding graphics from main processor 110 on bus 150, thereby rendering the desired graphics output from the main processor. A modem or other communications adapter 250 and a hard disk 255 may also be located in slots 160C and 160D to provide communications with main processor 110 across bus 150. Modem 250 may communicate with other data processing systems 270 across communications line 260. Computer readable removable media 290, such as a magnetic diskette or a compact disc, may be inserted into an input/output device 285, such as a disk drive or a CD-ROM (compact disc—read only memory) driver. Data is read from or written to the removable media by the I/O device under the control of the I/O device controller 280. The I/O device controller communicates with the main processor through slot 160E across bus 150. Main memory 120, hard disk 255 and removable media 290 are all referred to as memory for storing data for processing by processor 110. One of the preferred implementations of the present invention is as several sets of instructions in a code module resident in the main memory 120. Until required by the computer system, the sets of instructions may be stored in another computer memory, for example, in a hard disk drive, or in a removable memory such as an optical disk for eventual use in a CDROM or a floppy disk for eventual use in the floppy disk drive.

SOM is described in greater detail in copending and commonly assigned application Ser. No. 07/805,668 "Language Neutral Objects" filed May 4, 1992, to M. Conner et al, which is hereby incorporated by reference. SOM will be discussed in the present application only insofar as necessary to understand the present invention. Nonetheless, several facets of SOM are worth mentioning. Within SOM and other object oriented systems, each object has certain data attributes and methods which operate on the data. Data is said to be "encapsulated" by an object and can only be modified by the method which belongs to the object. Methods are typically invoked by sending a message to an object, identifying the desired method and supplying any needed arguments. Objects can be subclassed to create new objects. "Inheritance" is the ability to derive a new object from an existing object inheriting all properties such as methods and data structure from the existing object. The new object may have certain unique features such as new methods which are added to or override existing methods of the existing class. A new subclass needs only specify the functions and data which distinguish it from its already existing base class. Thus, the software developer does not need to develop an entirely new piece of code. He or she need only specify the new unique features of the software.

Distributed SOM (DSOM) is an extension to the System Object Model (SOM). Whereas SOM is a single address space object model directed to client processes utilizing only those objects located within the same address space as the client process, DSOM allows a client process in one address space to make calls on target objects residing in other address spaces. DSOM builds on SOM by making an object's location transparent to the client process. That is, a client process accesses a remote object by utilizing the same mechanism used for accessing an object located in the same address space as the client process. DSOM transmits the request from the client process to the target object and returns the results from the target object to the client process.

FIG. 2 is a block diagram illustrating the address spaces utilized by various processes in main memory according to a preferred embodiment of the invention. Main memory 120A and 120B are typically random access memories (RAM) for two different host computers. Each main memory has address spaces 291, 292, 293, 295 and 296 made available for various processes to utilize during execution. The processes utilizing these address spaces (each process is allocated one address space) could be client or server processes. Typically, a client process is the process that initiates requests for communications with objects not in its address space. In addition, a server process is typically the process that includes the target object and responds to the request for communications from the client process. Furthermore, the server process may become a client process should it initiate a request to communicate with an object not in its address space and the client process may become a server process should it include a target object for another client process.

FIG. 3 is a block diagram of the primary component utilized by a preferred distributed object system. A client process 300 and a surface processor 305 are shown running on the distributed object system. As described above with reference to FIG. 2, the client and server processes are running in different address spaces and may be on different host systems. The distributed object system provides the necessary communications between the client and server processes when needed.

The core piece of the distributed object system is DSOM runtime 310. DSOM runtime 310 handles all communications between the various elements illustrated in FIG. 3. DSOM runtime 310 communicates with client 300 via client interface 320 and with server 305 via object adapter 325. Client interface 320 provides a known or standard interface to various client processes. In the preferred embodiment, the client interface follows the common object request broker architecture (CORBA) and system object model (SOM) standards. Object adapter 325 provides a known or standard interface to various server processes. In the preferred embodiment, the object adapter also follows the CORBA and SOM standards. As a result, the preferred DSOM runtime 310 may communicate with and provide services for applications written to these known standards, thereby providing an open architecture. In addition, additional client and server processes may be supported concurrently in additional address spaces and possibly on other host systems by adding additional client interfaces and object adapters. In the preferred embodiment, some portions or all of the DSOM Runtime and its services and utilities reside on each of the host systems. This includes the necessary elements to handle communications between the hosts across networks. For ease of explanation, the DSOM Runtime and its services and utilities are illustrated as a single entity rather than as multiple distributed copies that communicate with each other in a transparent manner.

DSOM runtime 310 utilizes various service utilities. These service utilities include authentication service 330, activation service 340, location service 350 and marshalling service 360. Authentication service 330 verifies the identity of client processes requesting services of DSOM runtime 310. This is to prevent unauthorized utilization of the DSOM runtime functions including access or communications to objects residing in various server processes. Activation service 340 is responsible for activating various server processes when those server processes contain objects needed for communications with client processes. Location service 350 assists DSOM runtime 310 in locating on which host a desired server may be located. Marshalling 360 handles communications between processes by packaging the desired communications and then passing that package to either IPC based transport 362 or socket based transport 364 to perform the communications.

Interface repository 370 is a database providing information regarding how to communicate with objects located on other host or processes. As a centralized database, interface repository can provide various pieces of information to various elements of the distributed object system to perform communication with various objects. For example, marshalling 360 may query interface repository 370 regarding information about various objects that the marshalling service is attempting to communicate with on another host. Implementation repository 380 is a centralized database that provides information regarding which host a server process may reside on as well as other information needed for activation of those server processes by activation service 340. Since interface repository 370 and implementation repository 380 are databases, calls and updates to them may be one of many types of database queries and transactions known in the art. In the preferred embodiment, the interface repository and the implementation repository are flat files. Interface repository 370 contains information needed to make calls on objects including remote objects. In the preferred embodiment, this information includes the signatures of each type of call for each object including the form and data types needed to communicate with the objects. Implementation repository 380 contains a listing of the various types of objects available by class or other types of attributes, as well as which server that target object may be associated with. Utilization of the above described distributed object system is described below.

Figure 4:
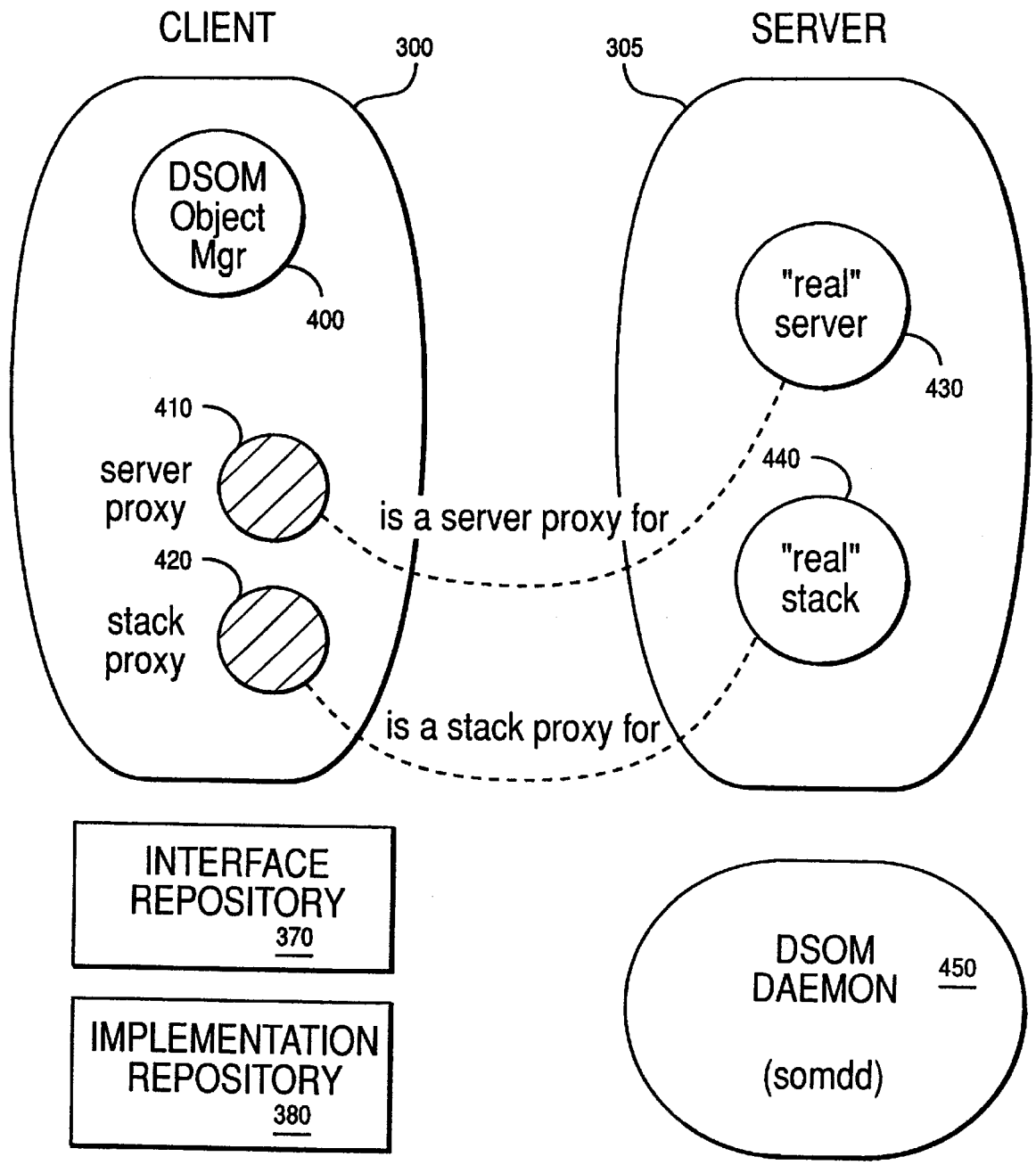
FIG. 4 is a block diagram illustrating various elements needed for utilizing proxy objects according to a preferred embodiment of the invention.

FIG. 4 is a block diagram illustrating various elements needed for utilizing proxy objects according to a preferred embodiment of the invention. Client process 300 includes an object manager 400 which is responsible for locating servers according to various attributes specified by the client. Client process 300 utilizes a server proxy object 410 and a stack proxy object 420 to communicate with a target server object 430 and a target stack object 440 located on server process 305. These proxy objects allow the object manager to utilize local addressing to communicate with objects located in a different address space. In order to perform these communications, interface repository 370 and implementation repository 380 will be utilized as described below. In addition, a daemon is utilized for establishing communications paths between client and server processes. A copy of the interface and implementation repositories may be stored on each host or they may be stored in a common memory or a distributed file system. In addition, a copy of the daemon should be running on each host system. The utilization of these elements will be described in greater detail below with reference to FIGS. 5 and 6.

FIGS. 5A–5D are block diagrams illustrating a client process bootstrapping communications with a server process and activating, invoking, and calling an object located in the server process. The server process has a separate address space from the client process and may be located on a separate host.

Figure 5A:
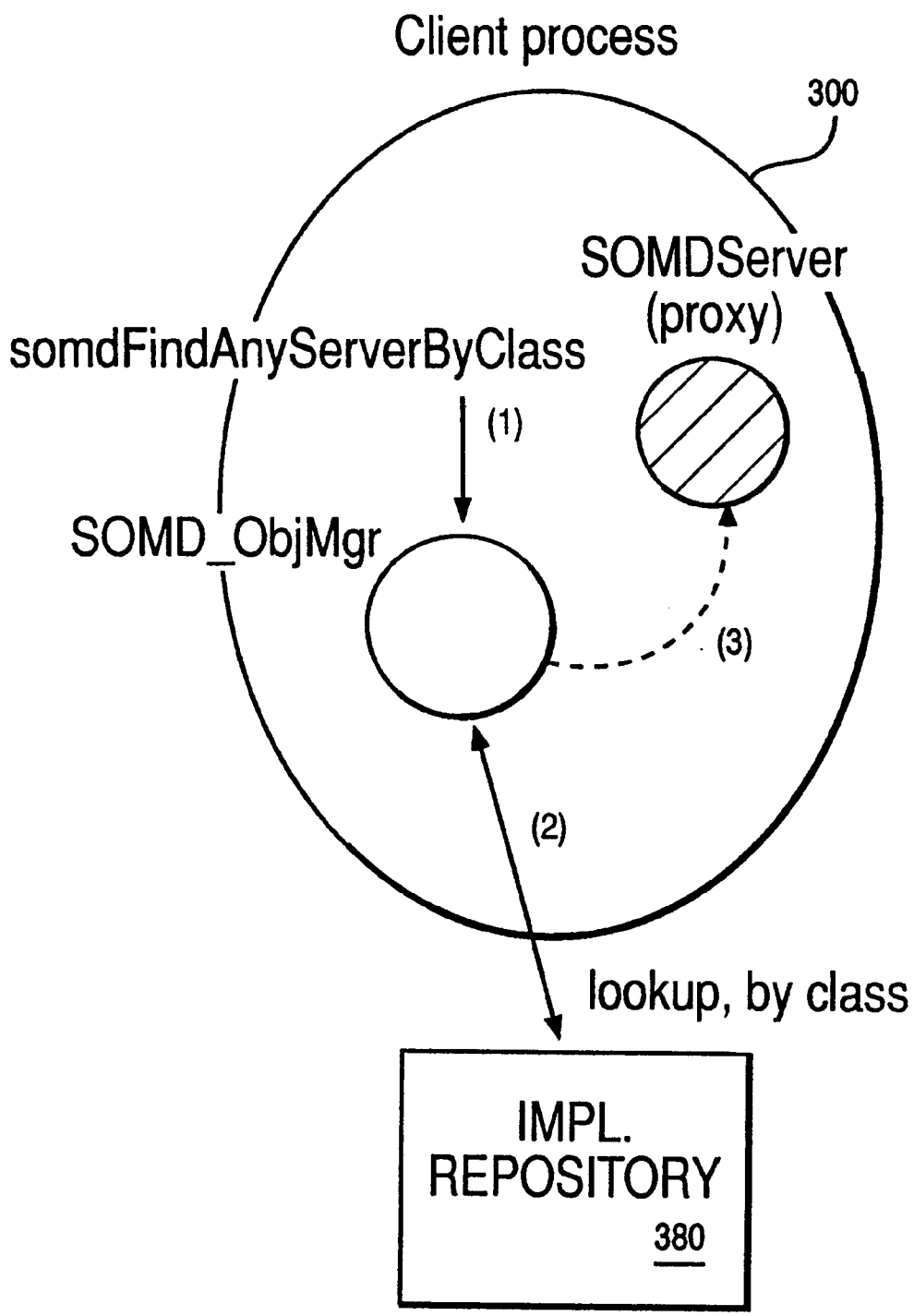
FIGS. 5A–5D are block diagrams illustrating a client process bootstrapping communications with a server process and activating, invoking, and calling an object located in the server process.

FIG. 5A illustrates a client process bootstrapping a server proxy object which manages communications to a server process that contains a desired target object. Upon activation or perhaps during processing, client process 300 may determine that it needs access to various objects, such as a printer object, which may be located in different address spaces and may also be located on a separate host. In the preferred embodiment, every client process has a SOMD_ObjMgr (distributed SOM object manager) which is responsible for locating servers according to various attributes specified by the client. A typical attribute utilized by the client process is object class (such as a type of printer). Upon determining that an object is needed to perform a desired function, the client process queries the SOMD_ObjMgr for a desired object by a SOMDFindAnyServerByClass call. Upon receiving the call from the client process the SOMD_

ObjMgr then queries the implementation repository 380 to determine whether any server supports such an object by that class. If so, then the SOMD_ObjMgr constructs a SOMDServer proxy object in the client address space representing the SOMDServer object of the server containing the target object unless such a proxy object already exists for that server. In the preferred embodiment, there is only on SOMDServer proxy object for each server process that the client process intends to communicate with since each server process has one and only one SOMDServer object. At this point, the remote server may not be running. However, the client process now has a basic interface tool to activate and invoke the server process when needed. As a result, a client process may have initialized access to desired server processes without requiring the overhead of invoking and activating those server processes until it is needed.

In the preferred embodiment, a proxy object is built by creating an instance of a class that inherits from a general proxy class (called SOMDClientProxy in the preferred embodiment) and the interface of the target object. This interface information may be obtained from the interface repository. Within the proxy object the portion of a method or call table utilized for target object calls will be replaced with pointers to a known general purpose dispatch mechanism (preferably called somdDispatch) inherited from SOMDClientProxy which allows the dynamic construction of calls on SOM objects. This general purpose dispatch mechanism is typically called dynamic method invocation in SOM. The standard somdDispatch mechanism has been overridden in the SOMDClientProxy with a generic mechanism for redirecting calls on the proxy to the remote object.

Figure 5B:
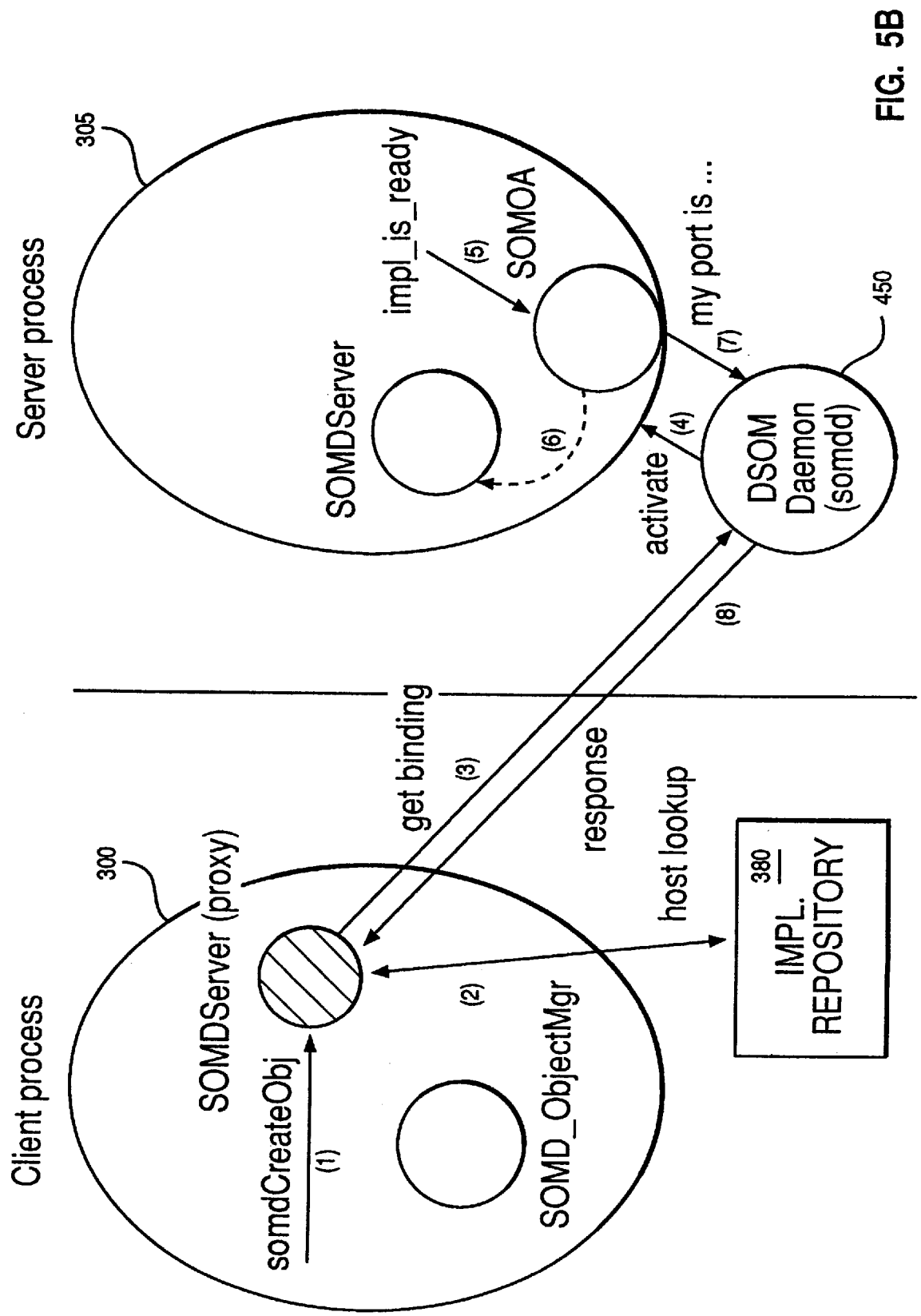

FIG. 5B is a block diagram illustrating a client process invoking a call to initiate communications with the server process containing the target object via the SOMDServer proxy. Because the proxy object has not yet established communications with the server process, the proxy object queries the implementation repository to locate which host the desired server process is located on and to determine how to communicate with the daemon on that host. The proxy then establishes communications with the daemon located on that host to obtain a binding to that server process. The daemon determines whether the server process is already activated. If so, then the daemon immediately returns the binding to the SOMDServer proxy object. However, if the server process is not already activated, then the daemon communicates with the implementation repository to determine the means by which to activate the server process. Once obtained, the daemon then activates the server process. Once activated the server preferably includes a SOMDServer object and SOM object adapter (SOMOA). The server process then tells the SOMOA that it is up and running. The SOMOA then communicates this to the daemon which then tells the proxy SOMDServer what the binding is for the server process. As a result, the client process has caused the server process to be activated and has obtained bindings necessary to handle direct communications with the server process.

Figure 5C:
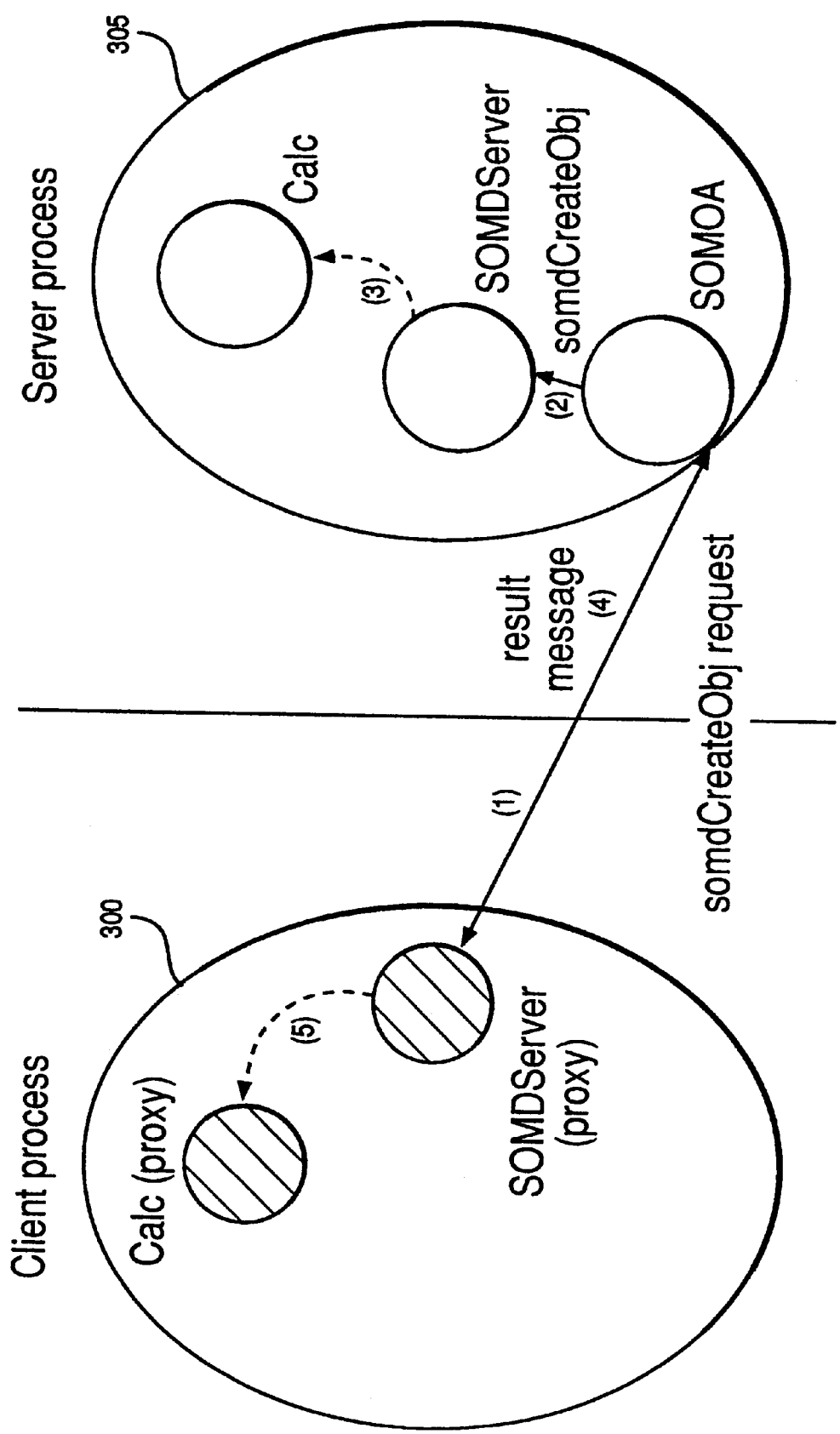

FIG. 5C is a block diagram illustrating the SOMDServer proxy object invoking an object in the server process as a result of the original call by the client process to the proxy object. The SOMDServer proxy object issues a create request directly to the SOMOA (SOM object adapter) in the server process. The SOMOA then passes this communication to the SOMDServer object. The SOMDServer object then generates the desired object (a Calc object within the present example) within the server process. The SOMD-Server object then communicates back to the client process via the SOMOA the results of the object generation within the server process. The SOMDServer proxy then causes a corresponding Calc proxy object to be generated in the client process. As a result of the above, the client process now has readily accessible communications to an active server process with a corresponding Calc object via the Calc proxy object.

Figure 5D:
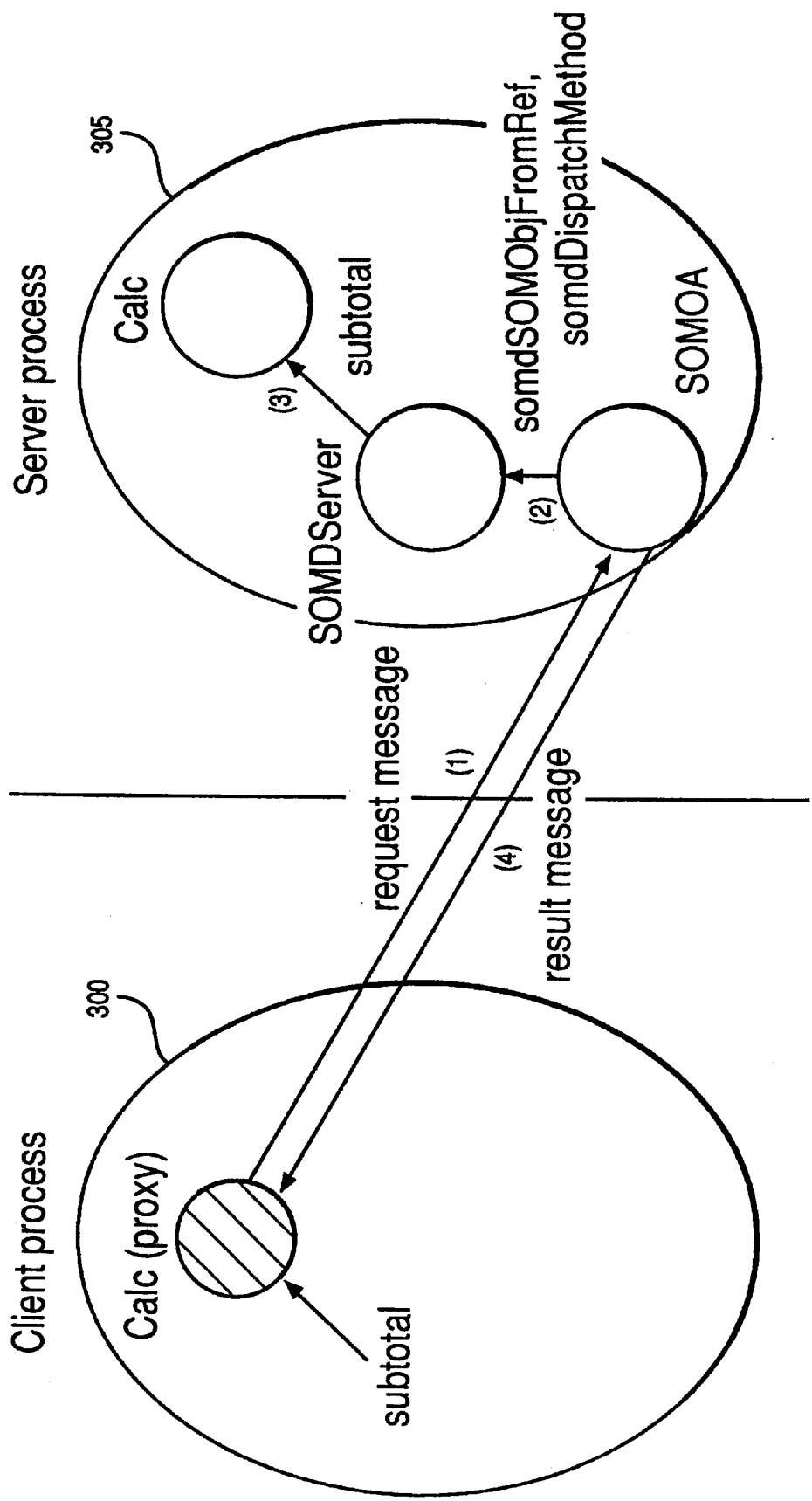

FIG. 5D is a block diagram illustrating the Calc proxy object providing communication to the server process Calc object. The client process invokes the Calc proxy with an operation such as subtotal. The Calc proxy then sends a request message to the server process SOMOA. The SOMOA then passes the request message to the SOMD-Server object. The SOMDServer then passes the request message to the Calc object for the actual calculations. The result of the calculations is then communicated back to the client process Calc proxy in a result message. As result, the Calc proxy appears to the client process to perform the desired operation without the client process actually being aware of the communications to the server process Calc object. In addition, the client process does not require special tools in order to communicate with objects in other address spaces.

Figure 6:
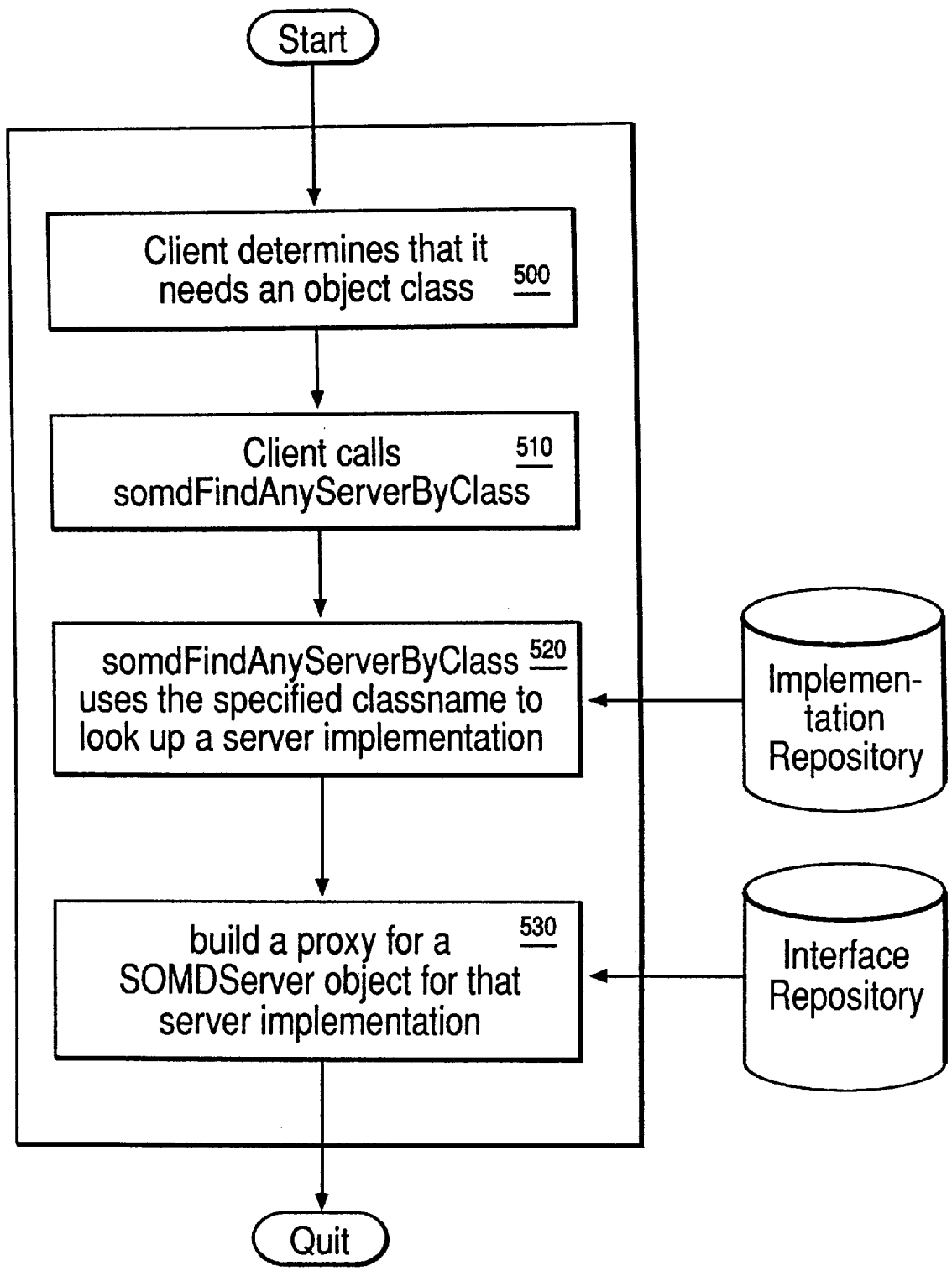
FIG. 6 is a flowchart corresponding to the bootstrapping operation described with reference to FIG. 5A.

FIG. 6 is a flowchart corresponding to the bootstrapping operation described with reference to FIG. 5A above. In a first step 500, it is determined that the client process needs a certain type or class of object that is not available in the local address space. This determination is typically performed by the client process in the preferred embodiment. This determination may occur during activation of the client process or during client process execution. In either case, this determination occurs during runtime of the client process according to the preferred embodiment of the invention. The object class may be one of many types of resources such as a printer, access to a database, etc. In step 510, the client process then generates and issues a SOMDFindAnyServer-ByClass call to the local SOMD_ObjMgr object. As mentioned above, the SOMD_ObjMgr is utilized by the client process to locate server processes which may contain a desired class of object. In step 520, the SOMD_ObjMgr then issues a query to the implementation repository for a server containing the desired class of object. This query is passed through client interface 320 to implementation repository 380 to obtain the desired information including which server contains the desired object. If a server for a desired target object is not located, then the client process is so notified. In step 530, if a desired target object is located, the DSOM Runtime then determines, by querying the client process, whether a SOMDServer proxy object already exists in the client process that is associated with the server containing the target object. If such a SOMDServer proxy object is not located in the client process, then the DSOM Runtime builds in the client process a SOMDServer proxy object associated with the server that contains the target object. The DSOM runtime accomplishes this by communicating with the interface repository, based on the information obtained from the implementation repository, to obtain interface information regarding the server containing the target object. This information is included in the SOMD-Server proxy object to facilitate communications with the server containing the target object upon request. Regardless of whether a new SOMDServer proxy object was generated or previously existed, the client process is then notified of the target object availability including a pointer to the SOMDServer proxy object.

In the preferred embodiment, at this point there has been no determination whether the server is currently executing or not. In addition, no communications have been passed to the server process. As a result, a minimal amount of overhead is needed to create the SOMDServer proxy object in the client process containing a communication path to the server containing the target object.

Figure 7A:
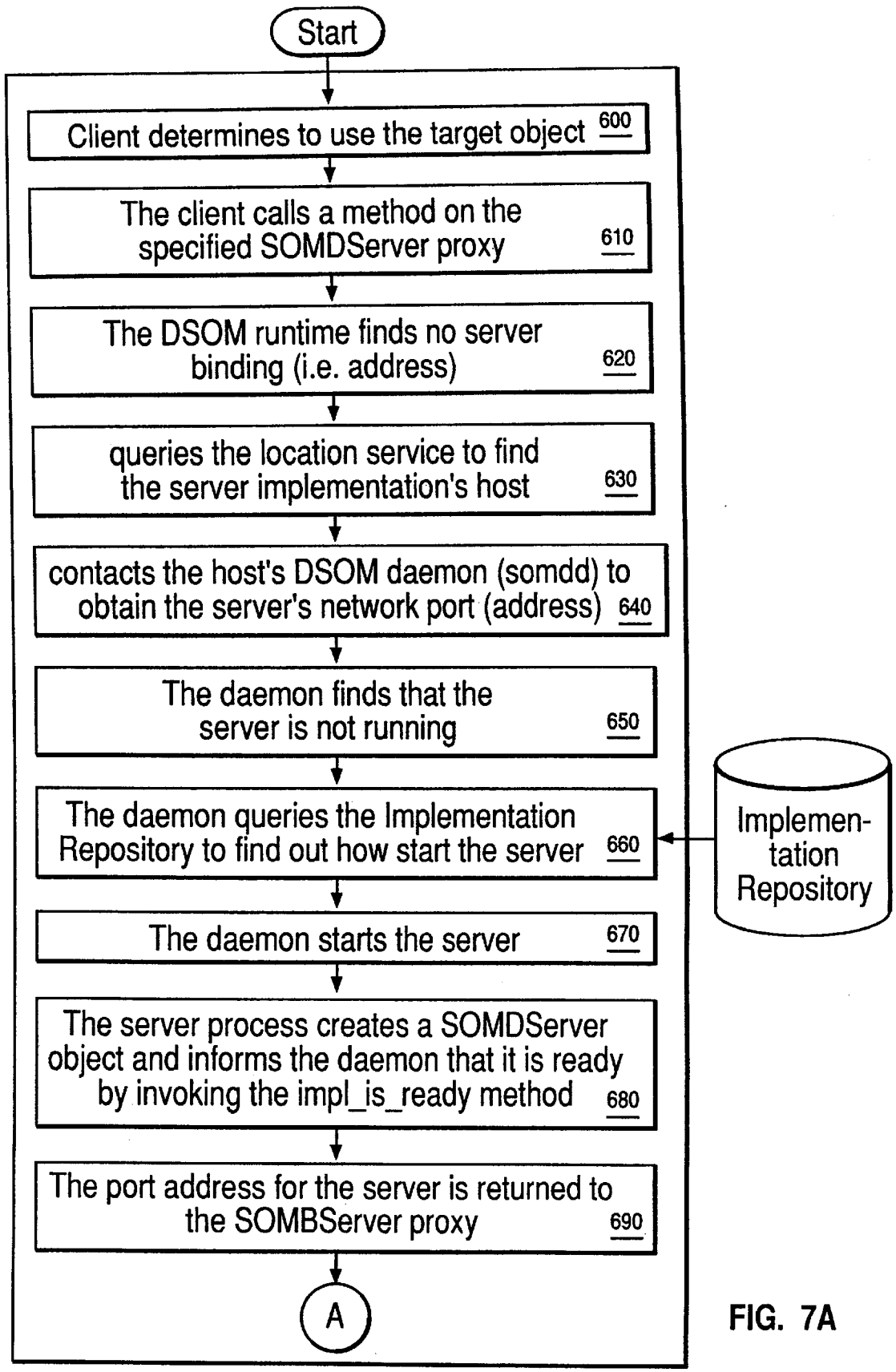
FIGS. 7A–7B are a flowchart corresponding to the activation and invocation operations described with reference to FIGS. 5B–5C.
Figure 7B:
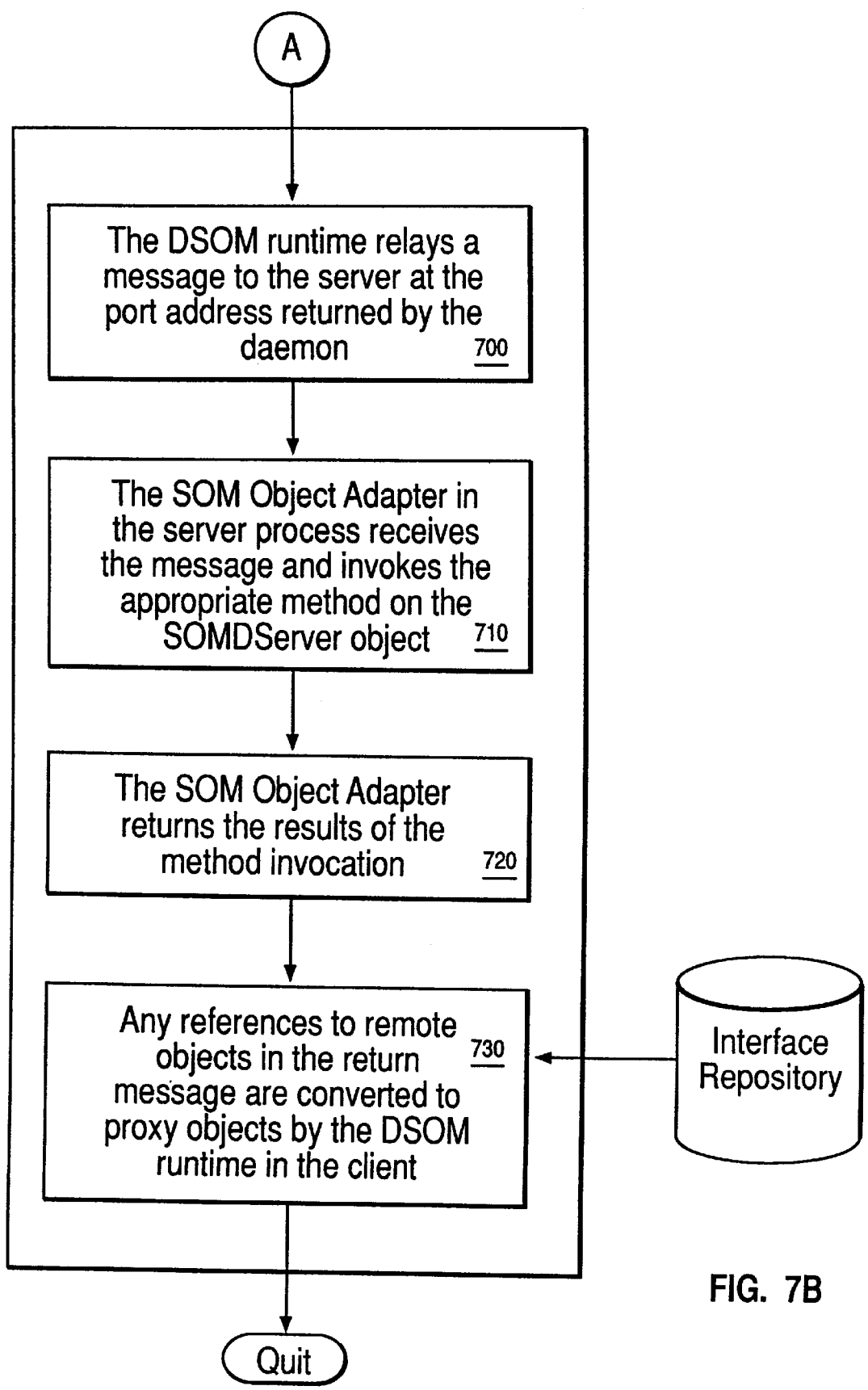

FIGS. 7A–7B are a flowchart corresponding to the activation and invocation operations described above with reference to FIGS. 5B–5C. In step 600, it is determined that the client process needs to utilize the target object. This determination is typically performed by the client process in the preferred embodiment. This determination may occur during activation of the client process or during client process execution. In either case, this determination occurs during runtime of the client process according to the preferred embodiment of the invention. In step 610, the client process makes a call to the server containing the target object via the SOMDServer proxy object. This call can include information necessary to perform the call. In step 620, the SOMDServer proxy object queries the DSOM Runtime to determine whether a previous communication had been made with the server containing the target object. If so, then the SOMDServer proxy object immediately passes the communication on to the server process as will be described below with reference to step 700. Otherwise, in step 630, the DSOM Runtime utilizes the location service to query the implementation repository to find which host the server is located on. Upon obtaining the host location, the DSOM runtime then contacts the host daemon to obtain the network port address of the desired server. In step 650, if the daemon determines that the server is already running, then the daemon returns the port address of the server process according to step 690 below. Otherwise, in step 660, the daemon queries the implementation repository to determine how to activate the server. In step 670, the daemon then activates the server. In the preferred embodiment, when the server process is activated, a SOM object adapter (SOMOA) is generated for handling communications between the server process and the daemon. This server activation function is a type of function typically performed by daemons. In step 680, the activated server process creates a SOMDServer object and informs the daemon via the SOMOA that the server process is ready for communications. In step 690, the daemon then returns the port address for the server process to the SOMDServer proxy object in the client process.

Now that the server process is activated, the DSOM Runtime can handle the original call from the client process to the server process. In step 700, the DSOM Runtime relays the call from the client process to the server process at the previously indicated port address. The SOMOA in the server process then receives the call and makes a call to the SOMDServer object. The SOMDServer object then will perform the call. For example, the SOMDServer object may create a desired calc object within the server process. However, the SOMDServer may perform other activities desired by the calling client process. In step 720, the SOMOA then returns the results of the call back to the SOMDServer proxy object via the DSOM runtime. In the case of the SOMDServer object generating a new target object in the server process to handle the call, the return results contain a reference to the new target object in the server process. Whenever this the case, in step 730, a proxy object corresponding to the target object referenced in the return results is then generated. This proxy object includes information from the interface repository regarding how to handle communications between the proxy object and the target object to which it corresponds.

Figure 8:
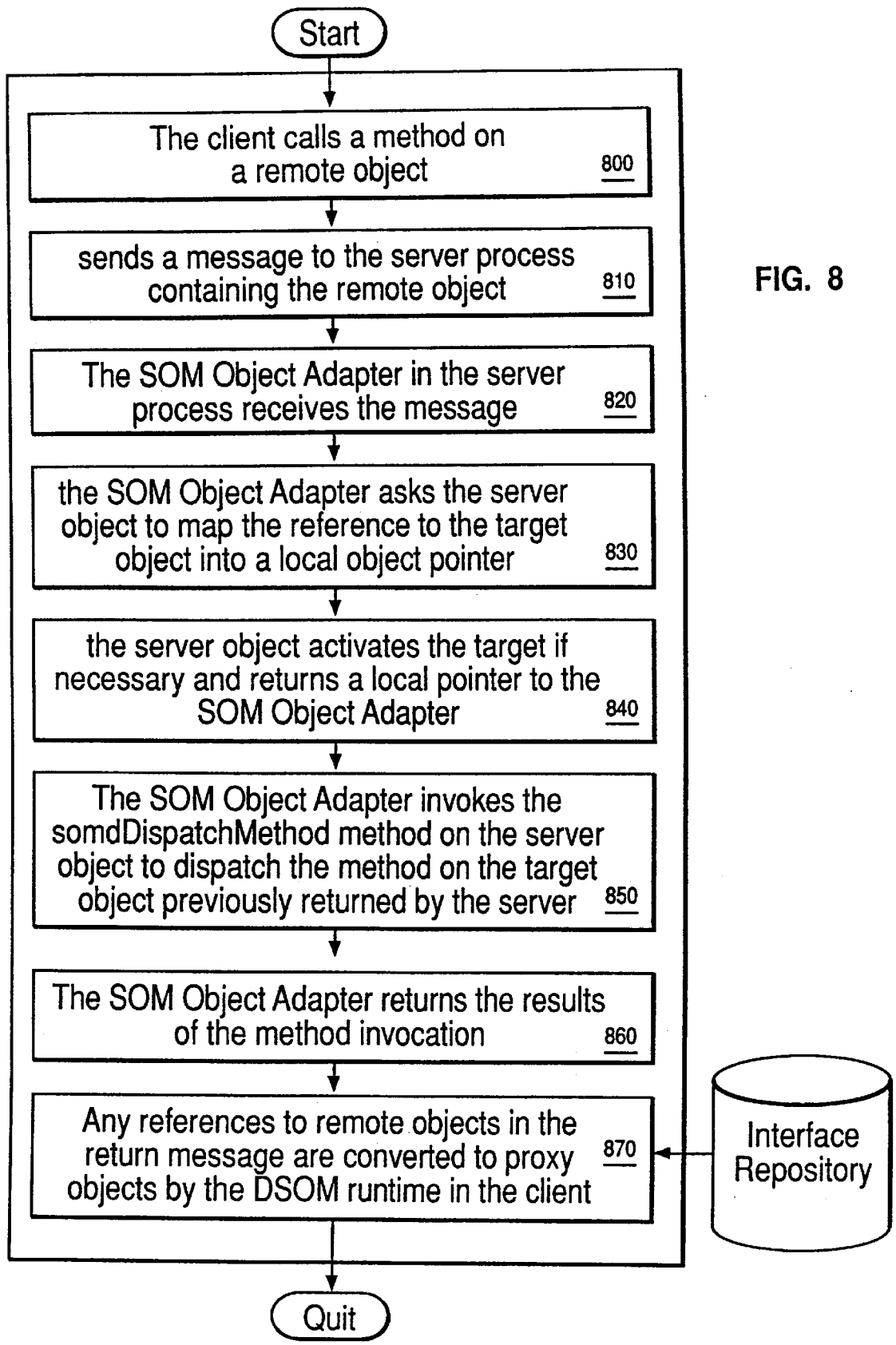
FIG. 8 is a flowchart corresponding to a call operation to a target object described with reference to FIG. 5D.

FIG. 8 is a flowchart corresponding to a call operation to a target object described above with reference to FIG. 5D. In a first step 800, the client process makes a call to the local proxy object requesting the proxy object perform some operation. The local proxy object then makes a call to the target object in the server process via the DSOM runtime. If not already activated, the server process will be activated as described above. In step 820, the SOMOA in the server process receives the call. In step 830, the SOMOA asks the SOMDServer object for a local pointer to the target object. In step 840, the SOMDServer object activates the target object if necessary and returns a local pointer to the SOMOA. In step 850, the SOMOA then makes a call to the SOMDServer object to dispatch the original call from the client process to the target object. The target object then performs the call (in the illustrated case, a subtotal operation) and returns the results to the SOMOA via the SOMDServer object. In step 860, the SOMOA then returns the results of the call to the calc proxy object in the client process via the DSOM runtime. In the case of the SOMDServer object generating a new target object in the server process to handle the call, the return results contain a reference to the new target object in the server process. As described above, any return references to new target objects would be converted in step 870 by the DSOM runtime. This conversion would include converting the reference into the appropriate proxy objects in the client process while utilizing the interface repository.

The SOMDServer object activates and calls objects for execution in response to communications received by the SOMOA and relayed to the SOMDServer. Typically, the basic object adapter (BOA) for a process will activate and call objects in response to communications without utilizing an intermediate object. By utilizing the SOMDServer object to activate and call objects in response to communications from other address spaces, the user has the capability of easily modifying the activation and calling processes by subclassing the SOMDServer or by utilizing other techniques well known in the art of object oriented programming.

Appendix A contains additional information regarding the use of the distributed object system.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method for a first process in a first address space to communicate with an object in a second address space comprising the computer implemented steps of:
    a) determining, during run time of the first process, that a requested communication link needed by the first process is needed with a target object located in the second address space;
    b) generating a proxy object in the first address space corresponding to the target object, said generated proxy object emulating said target object in the first address space; and
    c) establishing the communication link between the first process and the target object through the proxy object.

2. The method of claim 1 further comprising a step of locating said target object.

3. The method of claim 1 wherein the step of establishing includes establishing the communication link across a network between host systems.

4. The method of claim 1 further comprising a step of communicating between said first process and said target object through said proxy object.

5. An apparatus in a computer system for a first process in a first address space to communicate with an object in a second address space comprising:
   a) means for determining, during runtime of the first process, that a requested communication link needed by the first process is needed with a target object located in the second address space;
   b) means for generating a proxy object in the first address space corresponding to the target object, said generated proxy object emulating the target object in the first address space; and
   c) means for establishing the communication link between the first process and the target object through the proxy object.

6. The apparatus of claim 5 further comprising means for locating said target object.

7. The apparatus of claim 5 wherein the means for establishing includes means for establishing the communication link across a network between host systems.

8. The apparatus of claim 5 further comprising means for communicating between said first process and said target object through said proxy object.

9. A data processing system for a first process in a first address space to communicate with an object in a second address space comprising:
   a) means for storing data to be processed;
   b) means for processing data;
   c) means for determining, during runtime of the first process, that a requested communication link needed by the first process is needed with a target object located in the second address space;
   d) means for generating a proxy object in the first address space corresponding to the target object, said generated proxy object emulating the target object in the first address space; and
   e) means for establishing the communication link between the first process and the target object through the proxy object.

10. The data processing system of claim 9 further comprising means for locating said target object.

11. The data processing system of claim 9 wherein the means for establishing includes means for establishing the communication link across a network between host systems.

12. The data processing system of claim 9 further comprising means for communicating between said first process and said target object through said proxy object.

13. A computer program product stored in computer memory executable by a processor in a computer system for a first process in a first address space to communicate with an object in a second address space comprising:
   a) means for determining, during runtime of the first process, that a requested communication link needed by the first process is needed with a target object located in the second address space of said computer system;
   b) means for generating a proxy object in the first address space of said computer system corresponding to the target object, said generated proxy object emulating the target object in the first address space; and
   c) means for establishing the communication link between the first process and the target object through the proxy object.

14. The computer program product of claim 13 further comprising means for locating said target object.

15. The computer program product of claim 13 wherein the means for establishing includes means for establishing the communication link across a network between host systems.

16. The computer program product of claim 13 further comprising means for communicating between said first process and said target object through said proxy object.

* * * * *